US008358592B2

(12) United States Patent
Watanabe et al.

(10) Patent No.: US 8,358,592 B2
(45) Date of Patent: *Jan. 22, 2013

(54) NETWORK CONTROLLER AND CONTROL METHOD WITH FLOW ANALYSIS AND CONTROL FUNCTION

(75) Inventors: Yoshinori Watanabe, Chigasaki (JP); Takashi Isobe, Machida (JP); Hidemitsu Higuchi, Ebina (JP); Takeshi Aimoto, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 212 days.

This patent is subject to a terminal disclaimer.

(21) Appl. No.: 12/470,000

(22) Filed: May 21, 2009

(65) Prior Publication Data
US 2009/0232000 A1 Sep. 17, 2009

Related U.S. Application Data

(63) Continuation of application No. 11/365,609, filed on Mar. 2, 2006, now Pat. No. 7,609,629.

(30) Foreign Application Priority Data

Apr. 6, 2005 (JP) .................................. 2005-109744
Jan. 30, 2006 (JP) .................................. 2006-019980

(51) Int. Cl.
*H04L 12/28* (2006.01)
(52) U.S. Cl. ...................................................... 370/254
(58) Field of Classification Search .................. 370/230, 370/230.1, 235, 254; 726/22, 23, 24, 25
See application file for complete search history.

(56) References Cited

U.S. PATENT DOCUMENTS

| 7,051,369 | B1 * | 5/2006 | Baba ................................ 726/23 |
| 2004/0250124 | A1 | 12/2004 | Chesla et al. |
| 2005/0125195 | A1 * | 6/2005 | Brendel ........................ 702/182 |
| 2005/0152375 | A1 * | 7/2005 | An et al. .................. 370/395.41 |
| 2005/0198519 | A1 * | 9/2005 | Tamura et al. ................ 713/188 |
| 2006/0021040 | A1 * | 1/2006 | Boulanger et al. ............. 726/23 |
| 2006/0026220 | A1 * | 2/2006 | Margolus ..................... 707/204 |
| 2006/0221855 | A1 | 10/2006 | Hao et al. |
| 2006/0288296 | A1 * | 12/2006 | Rosenbluth et al. .......... 715/734 |
| 2007/0044147 | A1 | 2/2007 | Choi et al. |
| 2007/0094730 | A1 | 4/2007 | Bhikkaji et al. |
| 2008/0307524 | A1 * | 12/2008 | Singh et al. ..................... 726/22 |

FOREIGN PATENT DOCUMENTS

| JP | 2001-217842 | 8/2001 |
| JP | 2003-223375 | 8/2003 |
| JP | 2005-285048 | 10/2005 |

* cited by examiner

*Primary Examiner* — Mark Rinehart
*Assistant Examiner* — Peter Cheng
(74) *Attorney, Agent, or Firm* — Mattingly & Malur, PC

(57) ABSTRACT

A network controller, capable of high-speed extraction of malicious traffic from networks and determining characteristics of such traffic, includes a unit for accumulating a number of packets for each arbitrary itemset included in the header portions of packets to be transferred, and a unit for determining whether the accumulated value obtained by the accumulating unit exceeds a predetermined threshold, and determines the types of packets to be transferred from accumulated values of the itemset and an itemset different from the itemset when the number of packets exceed a threshold.

11 Claims, 15 Drawing Sheets

FIG. 2

PACKET COUNT TABLE (119)

ONE-ITEM TABLE (201)

| ENTRY NUMBER | ITEM 1 TYPE | ITEM 1 VALUE | NUMBER OF PACKETS |
|---|---|---|---|
| 0 | src ip | X | 4 |
| 1 | dst port | a | 200 |
| ⋮ | ⋮ | ⋮ | ⋮ |

TWO-ITEM TABLE (202)

| ENTRY NUMBER | ITEM 1 TYPE | ITEM 1 VALUE | ITEM 2 TYPE | ITEM 2 VALUE | NUMBER OF PACKETS |
|---|---|---|---|---|---|
| 0 | src ip | X | dst ip | W | 4 |
| 1 | src ip | Y | dst port | Y | 300 |
| ⋮ | ⋮ | ⋮ | ⋮ | ⋮ | ⋮ |

THREE-ITEM TABLE (203)

| ENTRY NUMBER | ITEM 1 TYPE | ITEM 1 VALUE | ----- | ITEM 3 TYPE | ITEM 3 VALUE | NUMBER OF PACKETS |
|---|---|---|---|---|---|---|
| 0 | src ip | X | ----- | src port | Y | 20 |
| 1 | src ip | X | ----- | src port | b | 5 |
| ⋮ | ⋮ | ⋮ | ⋮ | ⋮ | ⋮ | ⋮ |

FOUR-ITEM TABLE (204)

| ENTRY NUMBER | ITEM 1 TYPE | ITEM 1 VALUE | ----- | ITEM 4 TYPE | ITEM 4 VALUE | NUMBER OF PACKETS |
|---|---|---|---|---|---|---|
| 0 | src ip | X | ----- | dst port | b | 3 |
| 1 | src ip | X | ----- | dst port | c | 1 |
| ⋮ | ⋮ | ⋮ | ⋮ | ⋮ | ⋮ | ⋮ |

| THRESHOLD LEVEL | THRESHOLD |
|---|---|
| 1 | 100 |
| 2 | 500 |
| 3 | 1000 |
| 4 | 5000 |
| 5 | 20000 |

| TRAFFIC TYPE | LIMITING CONDITIONS | CONTROL CONTENT |
|---|---|---|
| NETWORK WORM | NONE | PROHIBITION |
| DDoS ATTACK | dst ip = x.x.x.x/n<br>THRESHOLD LEVEL = 2 | RATE LIMITING 50% |
| DDoS ATTACK | dst ip = y.y.y.y/m<br>THRESHOLD LEVEL = 4 | RATE LIMITING 20% |
| ⋮ | ⋮ | ⋮ |

FIG. 8

OVERTHRESHOLD INFORMATION

| | |
|---|---|
| TABLE TYPE | ~801 |
| ENTRY NUMBER | ~802 |
| THRESHOLD LEVEL | ~803 |
| SOURCE IP ADDRESS | ~804 |
| DESTINATION IP ADDRESS | ~805 |
| SOURCE PORT NUMBER | ~806 |
| DESTINATION PORT NUMBER | ~807 |
| PROTOCOL NUMBER | ~808 |

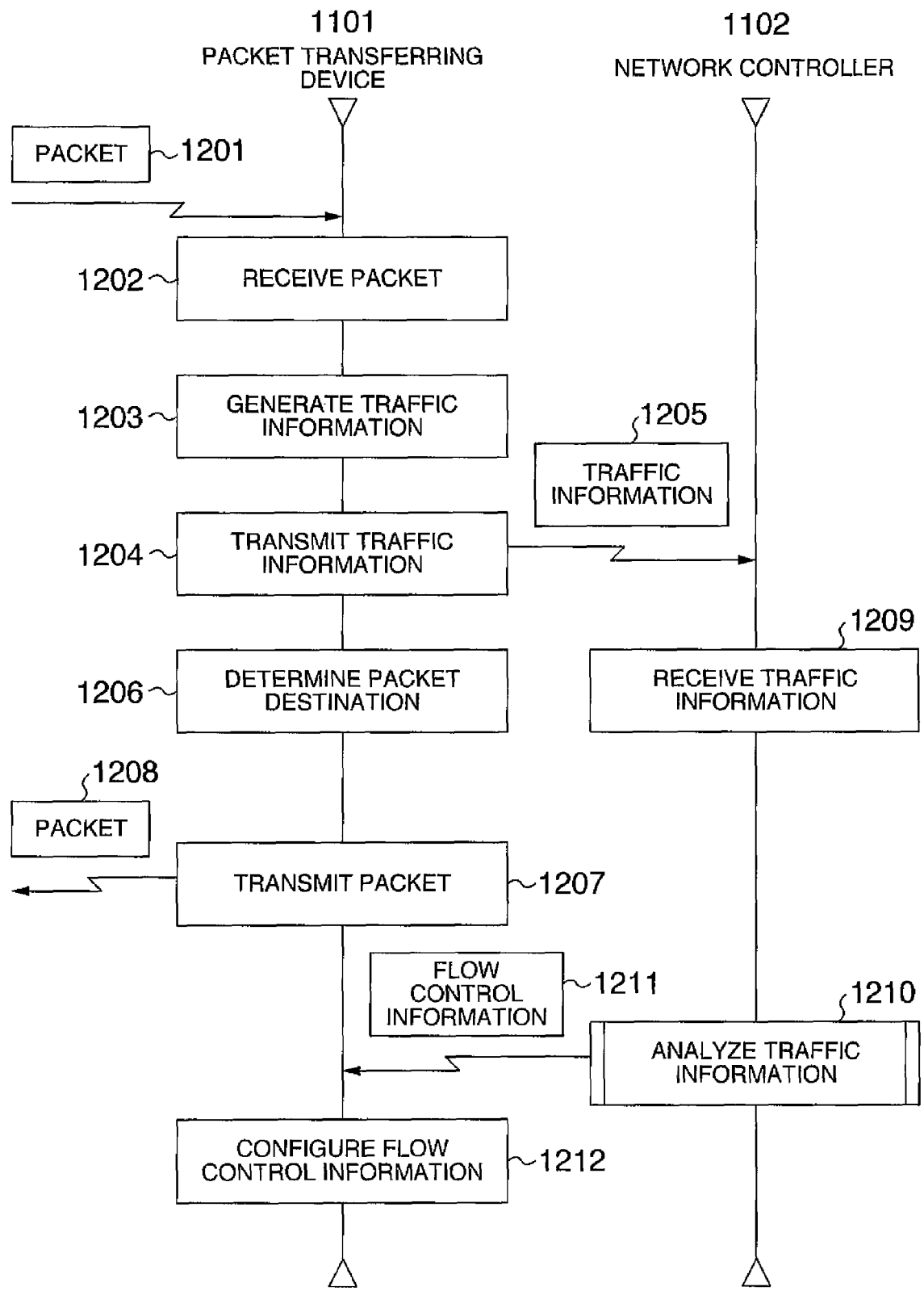

| ENTRY NUMBER | src ip | dst ip | src port | dst port | NUMBER OF PACKETS |
|---|---|---|---|---|---|
| 0 | VALUE: X | NUMBER OF APPEARED TYPES: 1 | NUMBER OF APPEARED TYPES: 2 | NUMBER OF APPEARED TYPES: 1 | 4 |
| 1 | NUMBER OF APPEARED TYPES: 20 | NUMBER OF APPEARED TYPES: 4 | NUMBER OF APPEARED TYPES: 150 | VALUE: a | 200 |
| 2 | VALUE: X | VALUE: W | NUMBER OF APPEARED TYPES: 2 | NUMBER OF APPEARED TYPES: 1 | 4 |
| 3 | VALUE: X | NUMBER OF APPEARED TYPES: 300 | NUMBER OF APPEARED TYPES: 1 | VALUE: c | 300 |
| 4 | VALUE: Z | VALUE: Y | NUMBER OF APPEARED TYPES: 8 | VALUE: d | 20 |
| 5 | VALUE: Y | VALUE: W | NUMBER OF APPEARED TYPES: 2 | NUMBER OF APPEARED TYPES: 2 | 100 |
| 6 | VALUE: X | VALUE: Z | VALUE: d | VALUE: a | 3 |
| ---- | ---- | ---- | ---- | ---- | ---- |

FIG. 15

| ITEMSET | | | | NEW APPEARANCE FLAG | | | | ENTRY NUMBER |
|---|---|---|---|---|---|---|---|---|
| src ip | dst ip | src port | dst port | src ip | dst ip | src port | dst port | |
| NOT PRESENT | NOT PRESENT | NOT PRESENT | PRESENT | 0 | 0 | 1 | 0 | 36 |
| NOT PRESENT | NOT PRESENT | PRESENT | NOT PRESENT | 0 | 0 | 0 | 1 | 2 |
| NOT PRESENT | NOT PRESENT | PRESENT | PRESENT | 1 | 0 | 0 | 0 | 342 |
| --- | --- | --- | --- | --- | --- | --- | --- | --- |
| PRESENT | NOT PRESENT | PRESENT | PRESENT | 0 | 0 | 0 | 0 | 40 |
| --- | --- | --- | --- | --- | --- | --- | --- | --- |
| PRESENT | PRESENT | PRESENT | PRESENT | 0 | 0 | 0 | 0 | NOT PRESENT |

1500

NETWORK CONTROLLER AND CONTROL METHOD WITH FLOW ANALYSIS AND CONTROL FUNCTION

CROSS-REFERENCE

This is a continuation application of U.S. Ser. No. 11/365,609, filed Mar. 2, 2006 (now U.S. Pat. No. 7,609,629).

INCORPORATION BY REFERENCE

The present application claims priorities from Japanese applications JP2005-109744 filed on Apr. 6, 2005 and JP2006-019980 filed on Jan. 30, 2006, the contents of which are hereby incorporated by reference into this application.

BACKGROUND OF THE INVENTION

The present invention relates to a network controller and a network control system for transferring packets on a network between networks, and more particularly, to a network controller and a network control system capable of effectively detecting inappropriate traffic from large volumes of traffic, and controlling the transfer of such traffic.

As the use of the Internet or LANs increases, the significance of stably operating such networks is increasing accordingly. In particular, the Internet allows an unspecified number of users to use various applications. Therefore, occurrences of traffic overloads that exceed the assumptions of Internet service providers, or traffic caused by fraudulent activities such as attacks or spreading of network worms are highly likely. Thus, there exists a problem in detecting and controlling such traffic in order to secure stability of normal communication.

Intrusion detection systems are known as a typical technique to address this problem. An intrusion detection system involves maintaining in advance patterns of malicious packets as a database, and detecting malicious packets by comparing received packets with the contents of the database. Since an intrusion detection system compares packets to be tested with a huge database of malicious packets, its processing speed can become an issue. However, methods for speeding up processing, for instance by narrowing down in advance the contents of databases to be compared against according to the types of servers existing within a secured network have been disclosed (see for instance JP-A-2003-223375).

In addition, as a technique to handle occurrences of excessive traffic that may trigger network congestion, methods such as determining in advance targets to be monitored on a per-user or per-computer basis, measuring information such as traffic volume for each monitoring target, and upon occurrence of congestions performing rate limiting on traffic with high traffic volumes have been disclosed (see for instance JP-A-2001-217842).

Furthermore, recently traffic analysis methods such as using basket analysis for high-speed extraction of traffic with predetermined characteristics that occupy wide bands in networks such as Internet backbone networks through which vast volumes of traffic flow, have been disclosed (see for instance JP-A-2005-285048). Basket analysis is a data mining method commonly used for analyzing data to determine which combinations of products are purchased together in retail stores and the like.

The technique disclosed in JP-A-2003-223375 attempts to speed up processing in an intrusion detection system that relies on pattern matching to detect malicious packets by reducing the patterns to be matched. This may be effective in, for instance, a network of a scale comparable to an entrance of an organizational network where only limited services are used. However, a ceiling exists on processing speed since pattern matching is performed for each packet, and therefore the technique is incapable of handling traffic of a scale comparable to Internet backbone networks.

The technique disclosed in JP-A-2001-217842 attempts to determine in advance monitoring targets, and manage the volumes of used traffic of the monitoring targets with a database. This technique may be sufficient for use in a limited environment of the monitoring targets. However, when applying it to an Internet backbone network through which an unspecified volume of traffic such as computers flows, it becomes difficult to determine in advance monitoring targets. Even if the technique is applied, it will require vast resources such as memory.

The technique disclosed in JP-A-2005-285048 may overcome the problems of processing ability or required resources such as memory described in JP-A-2003-223375 or JP-A-2001-217842. However, the technique does not consider acquiring information necessary to accurately determine characteristics of extracted traffic (for example DDoS attack, network worm outbreak, P2P file exchange). Therefore, it is difficult to prevent miscontrol of extracted traffic when attempting to perform prohibition and other controls on the extracted traffic.

SUMMARY OF THE INVENTION

Therefore, it is an object of the present invention to provide a network controller and a network control system capable of high-speed extraction and characteristic determination of inappropriate traffic even in networks with vast volumes of traffic such as an Internet backbone network.

It is another object of the present invention to provide a network controller and a network control system capable of extracting network devices generating excessive traffic with minimal memory resources without limiting monitoring targets.

It is yet another object of the present invention to provide a network controller and a network control system capable of performing automatic control according to preset control policies against traffic already extracted and their characteristics determined.

In order to achieve the above objects, a network controller includes a unit for accumulating the number of packets for each arbitrary itemset contained in the header portion of packets to be transferred, and a unit for determining whether an accumulated value obtained by the accumulating unit exceeds a predetermined threshold, wherein the network controller determines the type of packets to be transferred from an accumulated value of the itemset and another itemset that differs from the former itemset when the number of packets exceed the threshold.

The unit for accumulating numbers of packets is provided with an allocating unit that uses hash values of itemsets to allocate regions for retaining itemsets and accumulated valuesets, a unit for subtracting the accumulated value of a region when the allocating unit has allocated a region that is already used for accumulating another itemset, and a unit that enables the latter itemset to overwrite and use the region when the subtraction results in an accumulate value of 0.

The network controller further includes a flow control unit that controls whether or not a particular packet within traffic should be transferred, as well as the band to be used for the transfer, and a unit for changing the settings of the flow control unit according to the results of the packet type determination.

Thus, there is provided a network controller including a connection unit for connecting to one or more networks, a monitoring unit for monitoring packets flowing through the networks, an accumulating unit for accumulating the number of packets obtained by the monitor unit wherein the values of any one or more fieldsets are the same, and a packet estimating unit for estimating the characteristics of a number of packets that have exceeded a designated threshold from a value of any one or more fieldsets that differ from the above-mentioned one or more fieldsets when the accumulated number of packets exceed the designated threshold.

Other problems, units and advantages will be revealed in the detailed description of the examples.

According to the present invention, since malicious packets can be extracted and their characteristics determined without having to perform pattern matching of packets, there is an advantage where the present invention may also be applied to high-speed networks with large volumes.

In addition, there is an advantage where packets in heavy traffic can be extracted without particularly limiting monitoring target packets, even when only a limited storage area can be used for the detection of specific traffic.

Furthermore, since the present invention enables control over detected specific traffic according to predesignated rules, countermeasures against malicious traffic such as prohibition and rate limiting may be swiftly imposed even in high-speed networks.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of a content of a packet count table according to the first example;

FIG. 3 is a diagram showing an example of a content of a threshold table according to the first example;

FIG. 4 is a diagram showing an example of a content of a control policy table according to the first example;

FIG. 8 is a diagram showing an example of a content of overthreshold information according to the first example;

FIG. 12 is a flowchart showing an example of an operation of the network control system according to the second example;

FIG. 13 is a diagram showing an example of a content of a packet count table according to a third example of a preferred embodiment of the present invention;

FIG. 15 is a diagram showing an example of a content of a supplementary table according to the third example.

DESCRIPTION OF THE EMBODIMENTS

A preferred embodiment of the present invention will be described below. However, the present invention is not limited to the described embodiment.

Examples of a network controller, a network control system and a network control method will be described with reference to the drawings.

1. First Example

Figure 1:
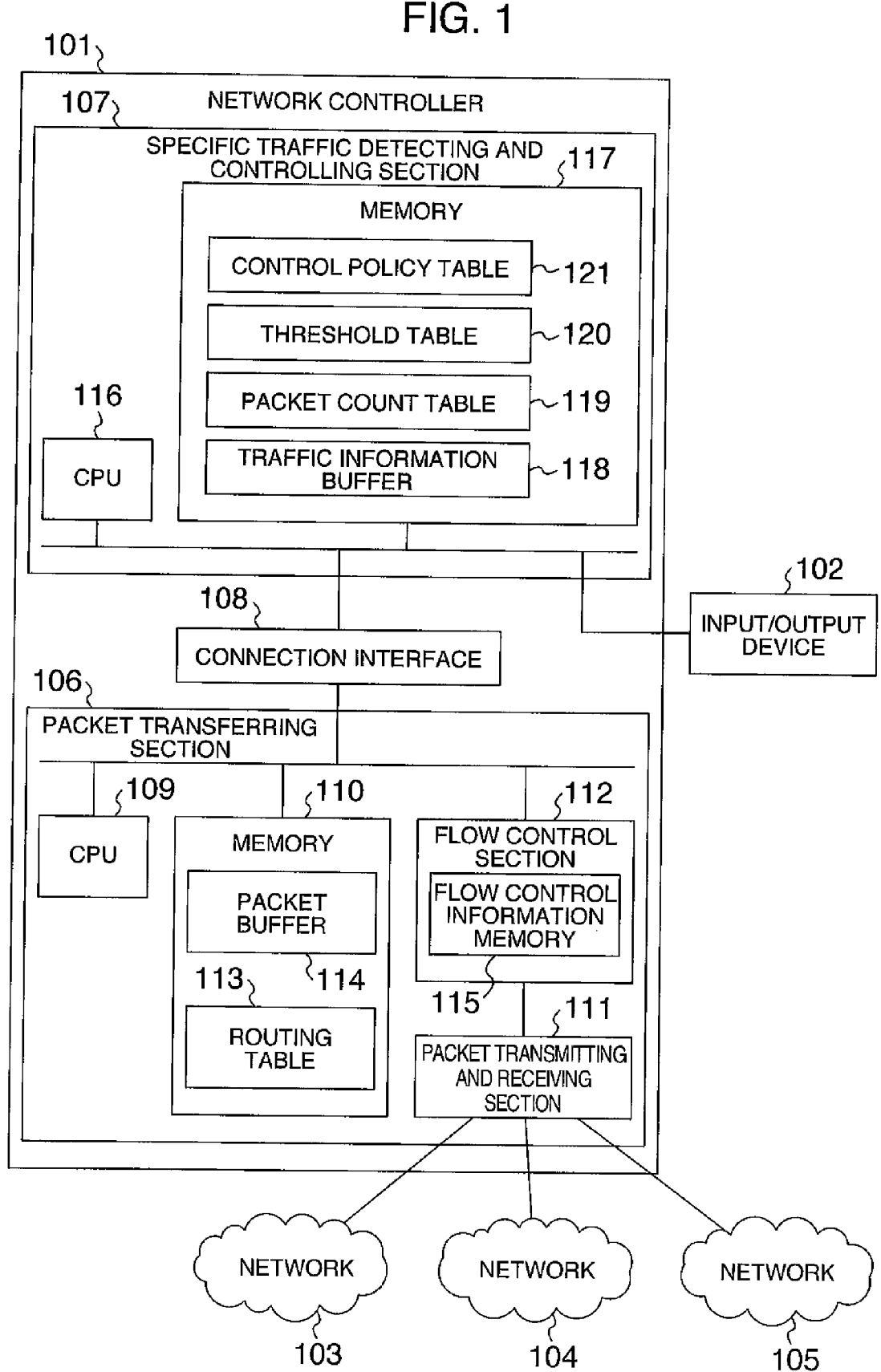
FIG. 1 is a diagram showing an example of a configuration of a network controller according to a first example of a preferred embodiment of the present invention.

A first example will now be described. FIG. 1 is a configuration diagram of a network controller according to an example of the present embodiment. In the drawing, reference numeral 101 denotes a network controller according to the present embodiment, reference numeral 102 denotes an input/output device for giving instructions to the network controller 101 and enabling it to display status, and reference numerals 103, 104 and 105 denote networks connected to the network controller 101.

The network controller 101 is composed of a packet transferring section 106 and a specific traffic detection and control section 107. A connection interface 108 connects the packet transferring section 106 and the specific traffic detection and control section 107, and allows data exchange between the packet transferring section 106 and the specific traffic detection and control section 107.

The packet transferring section 106 is composed of a CPU 109, a memory 110, a packet transmit/receive section 111 for transmitting and receiving packets between networks 103, 104 and 105, and a flow control section 112 which performs prohibition and rate limiting on packets. The memory 110 includes a routing table 113 for determining the network to be used for transferring according to destination addresses included in packets, and a packet buffer 114 that provides temporary storage for packets received at the packet transmit/receive section 111. In addition, the flow control section 112 includes a flow control information memory 115 for storing rules regarding prohibition and rate limiting to be performed on the packets.

The specific traffic detection and control section 107 is composed a CPU 116 and a memory 117. The memory 117 includes a traffic information buffer 118 for storing traffic information sent from the packet transferring section 106, a packet count table 119 for storing statistics on packets transferred by the packet transferring section 106 from the traffic information, a threshold table 120 for storing thresholds necessary to perform determination of the statistics, and a control policy table 121 describing processing to be performed when the statistics exceed the thresholds.

In the above configuration, upon receiving a packet from networks 103, 104 and 105, the packet transferring section 106 generates traffic information regarding the packet and hands it to the specific traffic detection and control section 107, and transmits the packet to the destination network according to the content of the routing table 113. The specific traffic detection and control section 107 statistically processes the traffic information and detects inappropriate traffic, and if necessary, generates configuration information for performing prohibition or rate limiting on the inappropriate traffic, and accordingly configures the flow control information memory 115 of the packet transferring section 106.

An example of an operation of the network controller 101 will now be described in detail using the flowchart shown in FIG. 5. The detailed description will commence with the processing at the packet transferring section 106 when a packet 501 arrives at the packet transmit/receive section 111 from either one of the networks 103, 104 or 105.

Packet reception commences when the packet 501 arrives at the packet transmit/receive section 111 (step 502). More specifically, the packet transmit/receive section 111 writes the content of the packet 501 into the packet buffer 114, and notifies the CPU 109 of the arrival of packet 501 by using an interrupt signal or the like. At this point, it is assumed that no rules for performing prohibition or rate limiting on the packet 501 have been configured at the flow control information memory 115.

Next, the CPU 109 generates traffic information from the content of the packet stored in the packet buffer 114 (step 503). The traffic information is generated by extracting a source IP address, a destination IP address, a source port number, a destination port number, and a protocol number contained in an IP header, as well as a TCP header or a UDP header of the packet. Elements of traffic information are not limited to the above, and other elements may be added if necessary. The generated traffic information is temporarily stored in the memory 110.

The CPU 109 then transmits the traffic information temporarily stored in the memory 110 to the specific traffic detection and control section 107 as traffic information 505 (step 504).

Figure 6:
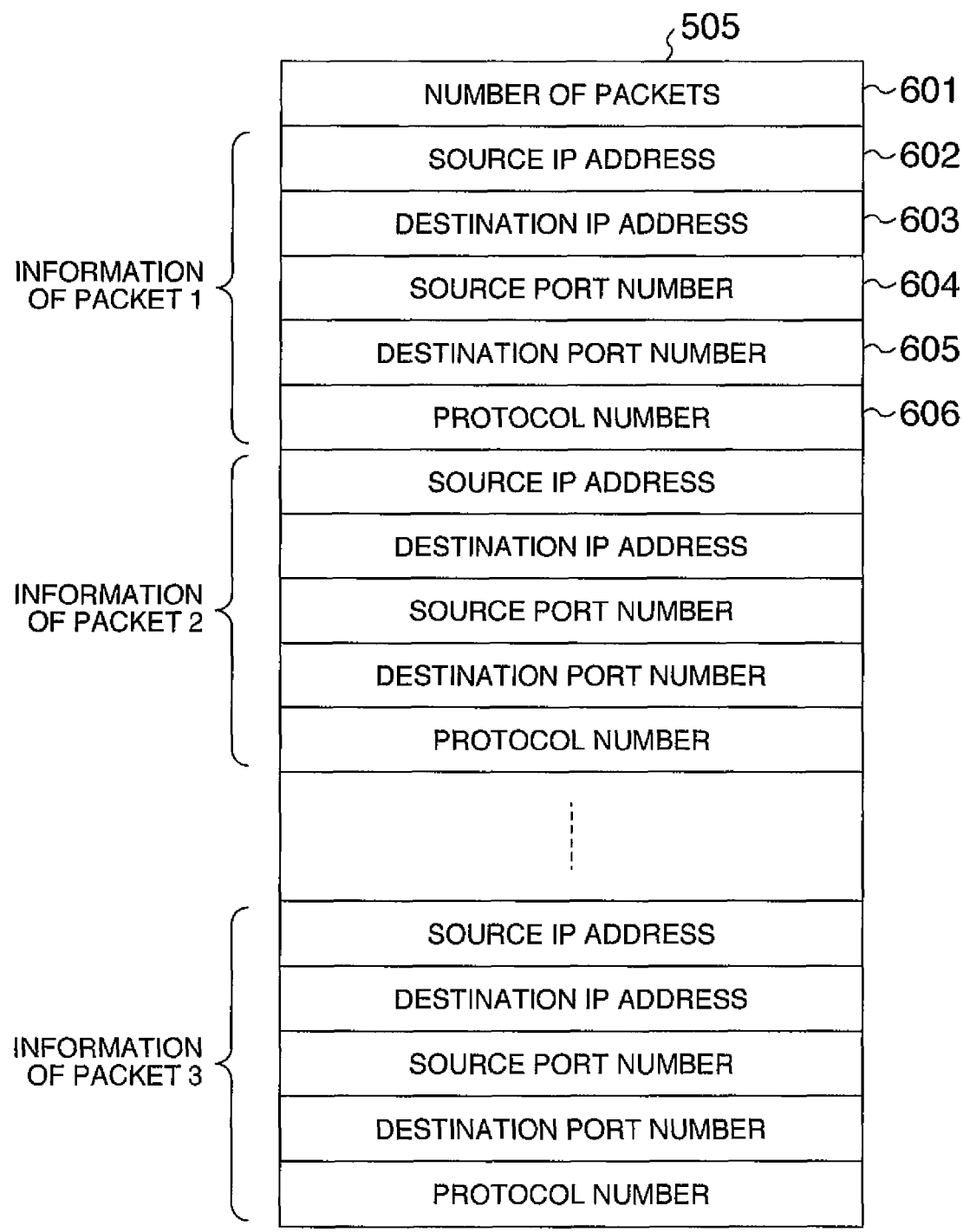
FIG. 6 is a diagram showing an example of a content of traffic information according to the first example.

FIG. 6 shows an example of the content of traffic information 505. A single packet's worth of traffic information is composed of a source IP address 602, a destination IP address 603, a source port number 604, a destination port number 605 and a protocol number 606, and is configured so that a plurality of such sets are stored. The number of stored packets is displayed as the packet number 601.

Single packet information is not limited to the five types described above, and may be the values of other items included in the IP header, as well as the TCP header or the UDP header, or a portion of data succeeding the TCP header or the UDP header.

Single packet information may also be the values of other items included in an IP header, as well as a TCP header or a UDP header, or a portion of data succeeding the TCP header or the UDP header, of an IP packet stored in a packet of tunneling protocols such as L2TP or PPP.

Single packet information may also be information included in an Ethernet (trademark) header or an MPLS label of a layer 2 packet storing an IP packet.

Alternatively, a predetermined number of bytes taken from the head of a packet may be stored as-is as the single packet information.

The traffic information 505 is arranged to be capable of storing a plurality of packet information in order to improve performance by reducing the number of data transfers from the packet transferring section 106 to the specific traffic detection and control section 107. Any number of packet information may be stored in traffic information 505.

In step 503, the retrieval of traffic information from the packets may be performed only on packets appropriately sampled, instead of all received packets. This enables processing of even high-speed networks with vast volumes of traffic.

The sampling may be performed on all packets sharing a particular characteristic to retrieve traffic information. The particular characteristic may be, for instance, packets set with SYN flags in TCP packets. This may improve detection accuracy of targeted inappropriate traffic in high-speed networks.

When an appropriate number of traffic information generated in step 503 accumulates in the memory 110, the CPU 109 configures the information into traffic information 505 and transmits it to the specific traffic detection and control section 107, and deletes the accumulated traffic information from the memory 110 (step 504). Examples of specific transmission methods to the specific traffic detection and control section 107 include, for instance, having the CPU 109 directly write traffic information 505 into the traffic information buffer 118 provided in the memory 117 through the connection interface 108, and notify the CPU 116 of the completion of the writing processing by an interrupt signal via the connection interface 108.

The CPU 109 then determines a destination network of the packet stored in the packet buffer 114 by referencing the routing table 113 (step 506). The routing table 113 includes a description, corresponding to the packet's destination IP address, regarding which network (in the present example, either one of the networks 103, 104 and 105) the packet should be forwarded to, and therefore enables determination of a destination network by retrieving the destination IP address from the packet 501 and searching the IP address from the routing table 113.

Finally, the packet stored in the packet buffer 114 is sent as a packet 508 to the destination network determined in step 506 (step 507).

Meanwhile, at the specific traffic detection and control section 107, when the CPU 116 receives notification of the transfer of traffic information 505 in the processing of step 504, the CPU 116 performs an analysis of traffic information 505, and upon detecting inappropriate traffic generates a flow control configuration information 510 for performing either prohibition or rate limiting on the traffic, and transmits it to the packet transferring section 106 (step 509).

Upon receiving the flow control configuration information 510, the CPU 109 of the packet transferring section 106 writes the content of the flow control configuration information 510 into the flow control setting memory 115 (step 511). The flow control section 112 is now able to perform control specified in the flow control configuration information 510 such as prohibition or rate limiting on the packet specified in the flow control configuration information 510. This concludes the description of the overall flow of the network controller 101.

Figure 9:
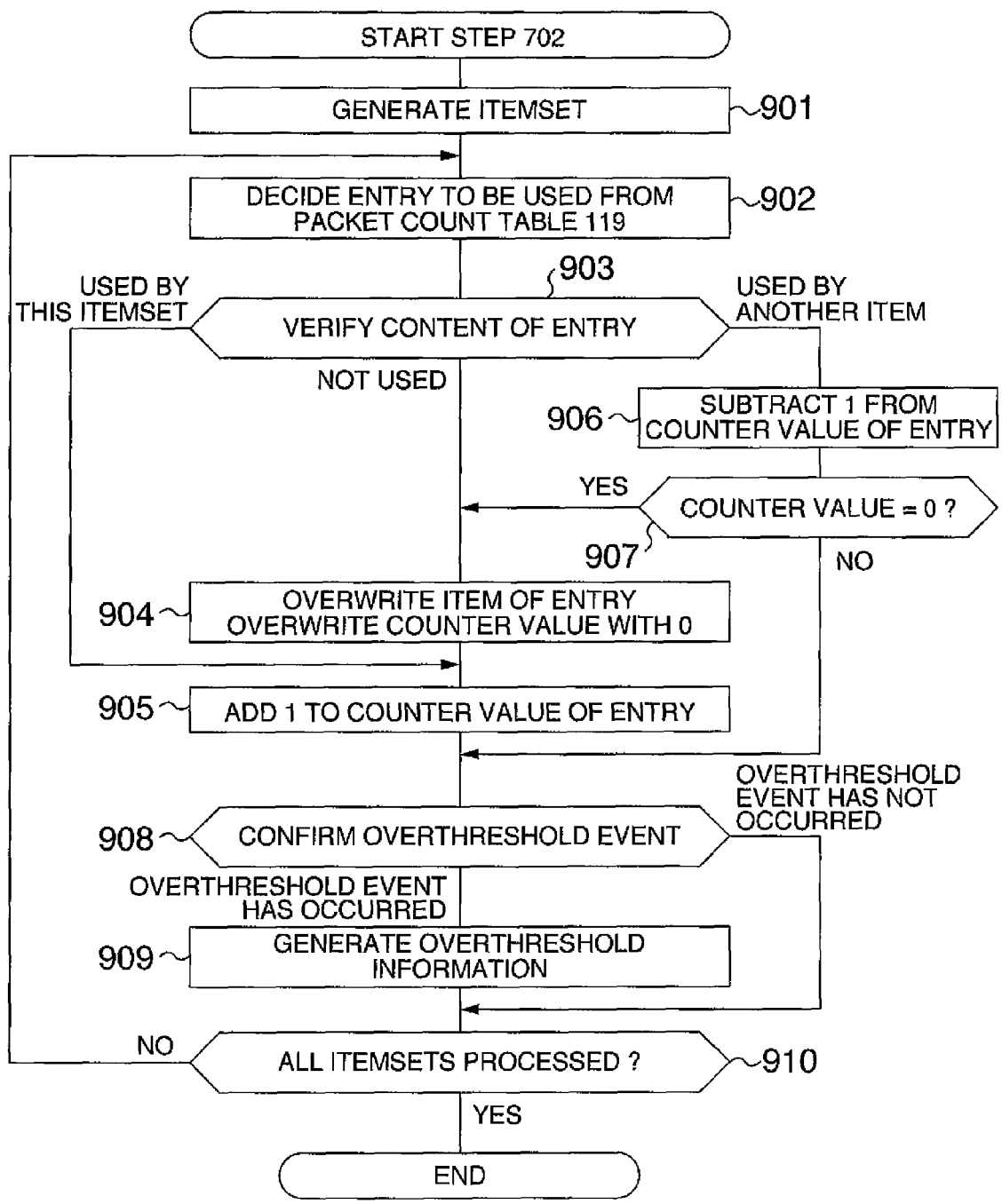
FIG. 9 is a flowchart showing an example of the details of updating the packet count table according to the first example.

Next, details of traffic information analysis performed by the specific traffic detection and control section 107 in step 509 will be described in further detail using the flowcharts shown in FIGS. 7, 8 and 9.

Figure 7:
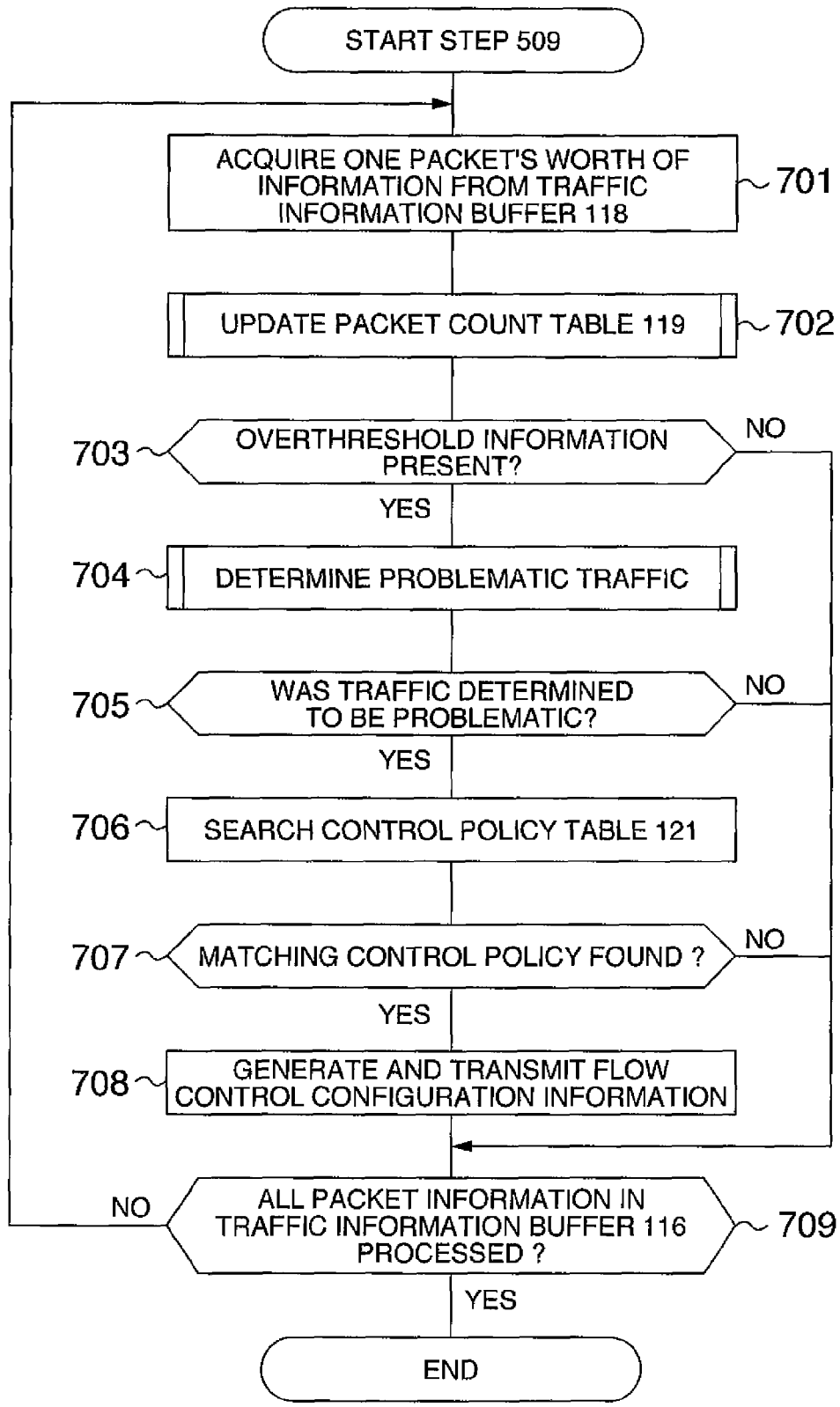
FIG. 7 is a flowchart showing an example of the details of traffic information analysis according to the first example.

FIG. 7 is a flowchart indicating the details of operation of the CPU 116 in step 509. First, the CPU 116 acquires one packet's worth of traffic information from the traffic information stored in the traffic information buffer 118 (step 701), analyzes the traffic information, and updates the packet count table 119 (step 702).

The structure of the packet count table 119 is shown in FIG. 2. The analysis method used in the traffic information analysis according to the present example extracts characteristic traffic by generating an arbitrary itemset of items composing traffic information, and accumulating the number of packets containing the itemset. The packet count table 119 is a table for retaining results of the accumulation. In the present example, it is assumed that four types of items compose the traffic information: namely, source IP address, destination IP address, source port number and destination port number. Itemsets of any n items (where 1≦n≦4) are generated from the aforementioned four items. The packet count table 119 is composed of a one-item table 201 for storing the accumulated value when n=1, a two-item table 202 for storing the accumulated value when n=2, a three-item table 203 for storing the accumulated value when n=3, and a four-item table 204 for storing the accumulated value when n=4. The tables are sometimes referred to as a first count section, a second count section, and so on.

In the present invention, while the items to be processed have been limited to the above four types, items may be added or deleted according to the characteristics of the traffic to be detected. For instance, flag information contained in a TCP header may be included to extract traffic related to establishing and terminating TCP sessions. Alternatively, the first given number of bytes of the application data following a TCP header or a UDP header may be included to better understand the characteristics of the traffic. Alternatively, when an MPLS label is attached, the MPLS label can also be included to perform traffic analysis per LSP. Alternatively, when using a tunneling protocol such as L2TP, tunnel identifiers may be included to perform analysis on traffic passing through the tunnels on a per-tunnel basis.

The details of updating the packet count table 119 in step 702 will be explained using another flowchart. FIG. 9 is a flowchart illustrating the detailed contents of the processing of step 702.

First, the CPU 116 generates itemsets of n given items selected from the aforementioned four items (step 901). In step 901, while all itemsets that are mathematically obtainable may be generated, it is also possible to generate only a limited number of itemsets for the purpose of speeding up processing by reducing load.

Next, one itemset is selected from those generated in step 901, and an entry in the packet count table 119 for accumulating the number of packets containing the selected itemset is decided (step 902). If the selected itemset consists of one item, the selection is made from the one-item table 201; if the itemset consists of two items, the selection is made from the two-item table 202; if the itemset consists of three items, the selection is made from the three-item table 203; and if the itemset consists of four items, the selection is made from the four-item table 204. Examples of the selection algorithm include a method where an appropriate hash function is applied to the selected itemset, and the resulting hash value is divided by the number of entries to obtain a hash number.

Once the entry to be used in step 902 is determined, the current content of the entry is verified (step 903).

If the entry is unused, the content of the selected itemset is written into the type and value fields of the items in the entry, and after setting the counter value field to 0 (step 904), 1 is added to the number of packets field in the entry (step 905).

On the other hand, after step 903, if the entry is already used by the selected itemset, the process jumps to step 905 to add 1 to the counter value in the entry.

Meanwhile, after step 903, if the entry is already used by another itemset, 1 is subtracted from the number of packets in the entry (step 906). If the result is 0, the process skips to step 904, otherwise the process skips to step 908 (step 907). This processing makes it easier for the itemset appearing more frequently to remain in the packet count table 119 when different itemsets attempt to use the same entry in the packet count table 119.

Next, the CPU 116 verifies whether the value of the number of packets field in the entry exceeds a predetermined threshold (step 908). The predetermined threshold is stored in the threshold table 120. The content of the threshold table 120 is as shown in FIG. 3. A plurality of thresholds may be defined, and a level number referred to as a threshold level may be defined for each threshold. While the example of FIG. 3 indicates that five threshold levels ranging from threshold level 1 to 5 have been defined, the number of possible levels is not limited to this example. It is assumed that the content of the threshold table 120 is configured in advance through the input/output device 102.

In step 908, when the value of the number of packets field equals any of the values defined in the threshold field of the threshold table 120, the CPU 116 determines that an overthreshold event has occurred, and generates overthreshold information (step 909). The content of overthreshold information is as shown in FIG. 8, and is composed of a table type 801 that indicates the type of table (in the present example, any of the tables ranging from the one-item table 201 to the four-item table 204) that contains the entry in which the overthreshold event had occurred, an entry number 802 that indicates the number of the entry, a threshold level 803 that corresponds to the threshold in the threshold table 120 when the overthreshold event occurred, as well as a source IP address 804, a destination IP address 805, a source port number 806, a destination port number 807 and a protocol number 808 contained in the traffic information to be analyzed. The generated overthreshold information is temporarily stored in the memory 117.

The processing performed in steps 902 through 909 is repeated until all the itemsets generated in step 901 are processed (step 910). This concludes the detailed description of the operation performed in step 702.

Returning to the flowchart of FIG. 7, once step 702 is concluded, the process verifies whether the overthreshold information generated in step 907 exists in the memory 117 (step 703). If so, determination of whether the overthreshold information is an inappropriate traffic is performed (step 704). As inappropriate traffic, the present example is capable of determining traffic caused by network worm outbreaks, and traffic caused by DDoS attacks on network computers.

Figure 10:
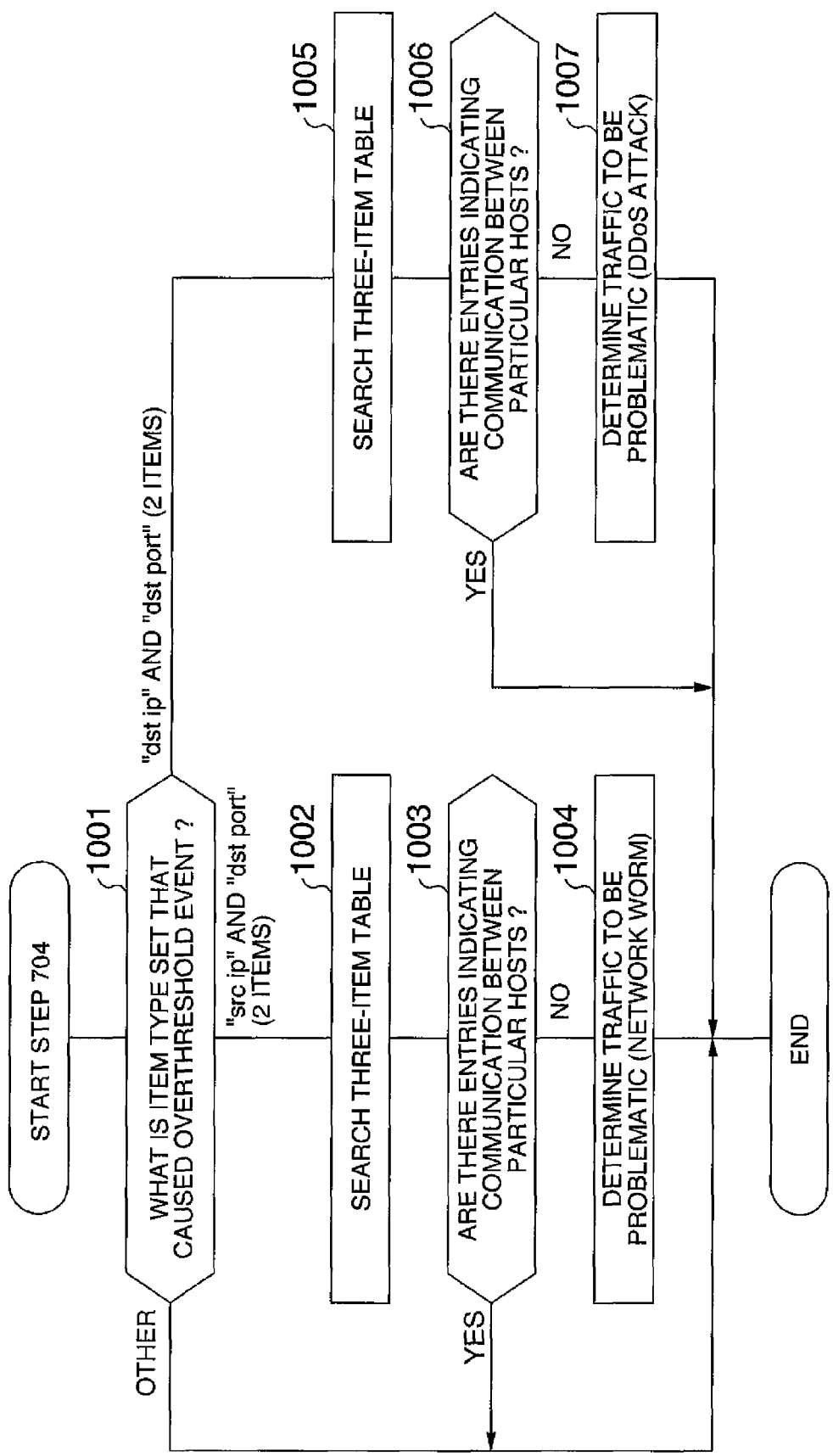
FIG. 10 is a flowchart showing an example of the details of determining problematic traffic according to the first example.

The details of distinguishing problematic traffic in step 704 will now be explained using a different flowchart. FIG. 10 is a flowchart illustrating the detailed contents of the processing of step 704.

First, the CPU 116 verifies the content of the item type field of the entry in the packet count table 119 specified by the table type 801 and the entry number 802 contained in the overthreshold information (step 1001).

When the table type 801 indicates the two-item table, and the values of the type field contained in the entry are a source IP address and a destination port number, it is determined that the traffic indicated by the overthreshold information is possibly traffic caused by a network worm outbreak, and steps 1002 and onward are performed for verification.

Computers infected by a network worm are likely to transmit traffic for further spreading the worm to an unspecified number of computers, and such traffic are usually forwarded to a particular port number. Therefore, when a large quantity of packets sharing a certain combination of a source IP address and a destination port number is observed, such packets may be determined to possibly be traffic caused by a network worm outbreak.

However, in order to truly determine that the packets are possibly traffic caused by a network worm outbreak, the contents of other entries in the packet count table 119 must also be verified. This is because, for instance, many packets sharing a certain combination of a source IP address and a destination port number are also observed during normal one-to-one communications between two particular computers.

Therefore, in order to distinguish such normal traffic from traffic caused by network worm outbreaks, a search is performed for entries of the three-item table 203 containing the source IP address and the destination port number of the overthreshold information, as well as the destination IP address in their type fields as their third item (step 1002).

When such an entry is found in step 1002, and the value of the number of packets field is large enough to justify determination as normal traffic, the traffic is determined to be normal traffic (step 1003). If not, the traffic is determined to be traffic caused by a network worm outbreak (step 1004).

Also, in step 1001, when the table type 801 indicates the two-item table, and the values of the type field contained in the entry are a destination IP address and a destination port number, it is determined that the traffic indicated by the overthreshold information is possibly traffic caused by a DDoS attack, and steps 1005 and onward are performed for verification.

Computers under DDoS attack receive communication requests at the same port number from a multitude of computers. Therefore, when a large quantity of packets sharing a certain combination of a destination IP address and a destination port number is observed, such packets may be determined to possibly be traffic caused by a DDoS attack.

However, in order to truly determine that the packets are possibly traffic caused by a DDoS attack, the contents of other entries in the packet count table 119 must also be verified. This is because, for instance, many packets sharing a certain combination of a destination IP address and a destination port number are also observed during normal one-to-one communications between two particular computers.

Therefore, in order to distinguish such normal traffic from traffic caused by DDoS attacks, a search is performed for entries of the three-item table 203 containing the destination IP address and the destination port number of the overthreshold information, as well as the source IP address in their type fields as their third item (step 1005).

When such an entry is found in step 1005, and the value of the number of packets field is large enough to justify determination as normal traffic, the traffic is determined to be normal traffic (step 1006). If not, the traffic is determined to be traffic caused by a DDoS attack (step 1007). This concludes the detailed explanation of step 704.

While the present example presents a method of determining traffic caused by network worm outbreaks and DDoS attacks as examples of detectable problematic traffic, problematic traffic detectable by the present embodiment are not limited to the above. For instance, when a particular computer is generating excessive traffic, it is possible to estimate the type of application (e.g. P2P file transfer) that is causing the traffic by analyzing the packet count table 119.

Returning to the flowchart shown in FIG. 7, when it is determined in step 704 that the overthreshold information generated in step 702 is problematic traffic (step 705), the CPU 116 searches whether a control method for the problematic traffic is described in the control policy table 121 (step 706).

FIG. 4 shows a configuration of the control policy table 121. The control policy table 121 is a table that defines the contents of controls such as prohibition or rate limiting by using filters for each traffic type including traffic caused by network worm outbreak or DDoS attacks. The control policy table 121 also allows configuration of limiting conditions for each traffic type by using IP addresses and port numbers, which makes it possible to define different control contents for different limiting conditions for the same traffic type. It is assumed that the contents of the control policy table 121 is configured in advance through the input/output device 102.

In step 706, an entry with a traffic type matching the problematic traffic type determined in step 704 and a limiting condition matching the information included in the overthreshold information generated in step 702 (from threshold level 804 to protocol number 809) is searched from the control policy table 121.

If an entry matching the problematic traffic is found in the control policy table 121 in step 706 (step 707), the CPU 116 generates flow control configuration information 510 that corresponds to the control content written in the entry, and transmits the generated information to the packet transferring section 106 (step 708). At this point, the discovery of problematic traffic may be displayed on the input/output device 102 as report information, or may be recorded into the memory 117.

This concludes the analysis on the one packet's worth of traffic information obtained in step 701. If any outstanding traffic information remains in the traffic information buffer 118, the steps 702 and onward are repeated. When processing is concluded for all traffic information for all packets, step 509 is concluded (step 709). This hereby concludes the detailed description of the traffic information analysis performed by the specific traffic detection and control section 107.

According to the present example, in a network controller for transferring packets between networks, it is an advantage of the present invention that traffic considered to be problematic may be effectively extracted from the packet to be transferred even when connected to a high-speed network, and countermeasures such as prohibition or rate limiting may be automatically imposed for such traffic.

2. Second Example

Figure 11:
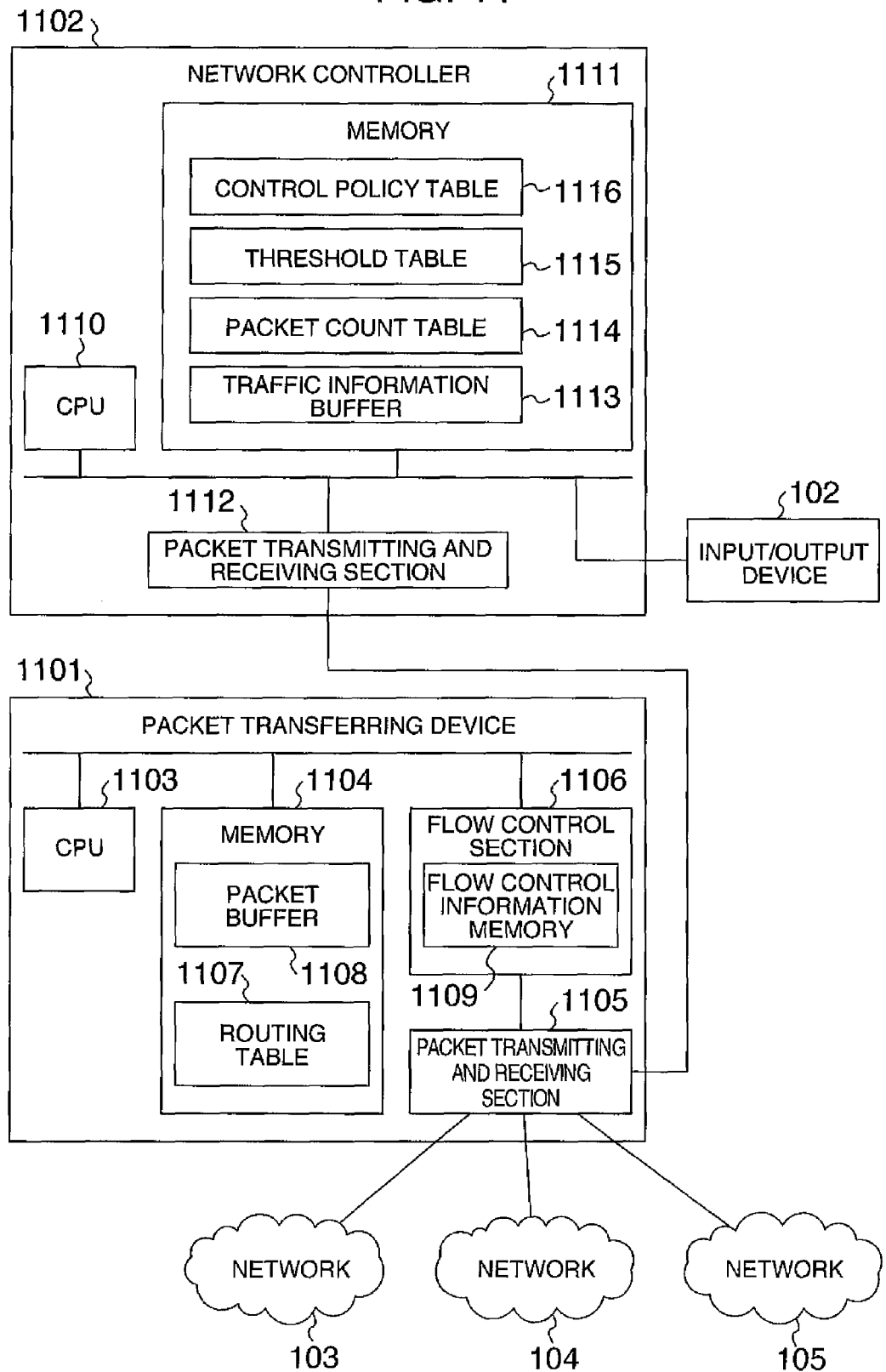
FIG. 11 is a diagram showing an example of a configuration of a network control system according to a second example of a preferred embodiment of the present invention.

A second example will now be described. FIG. 11 is a configuration diagram of a network controller according to a second example of the present embodiment. In the drawing, reference numeral 1101 denotes a packet transferring device for transferring packets between networks 103, 104 and 105, and reference numeral 1102 denotes a network controller for analyzing information received from the packet transferring device.

The packet transferring device 1101 is composed of a CPU 1103, a memory 1104, a packet transmit/receive section 1105 for transmitting and receiving packets between networks 103, 104, 105 and the network controller 1102, and a flow control section 1106. The memory 1104 includes a routing table 1107 for determining which network should be used for transfer according to destination addresses contained in packets, and a packet buffer 1108 that provides temporary storage for packets received at the packet transmit/receive section 1105. In addition, the flow control section 1106 includes a flow control information memory 1109 for storing rules such as filtering and rate limiting to be performed on the packets.

The network controller 1102 is composed of a CPU 1110, a memory 1111, and a packet transmit/receive section 1112 for transferring packets between the packet transferring device 1101. The memory 1111 includes a traffic information buffer 1113 for storing traffic information sent from the packet transferring device 1101, a packet count table 1114 for storing statistics on packets transferred by the packet transferring device 1101 from the traffic information, a threshold table 1115 for storing thresholds necessary to perform determination of the statistics, and a control policy table 1116 describing processing to be performed when statistics exceed the thresholds.

In the above configuration, upon receiving a packet from networks 103, 104 and 105, the packet transferring device 1101 generates traffic information regarding the packet and hands it to the network controller 1102, and transfers the packet to the destination network according to the contents of the routing table 1107. The network controller 1102 statistically processes the traffic information and detects inappropriate traffic, and if necessary, generates configuration information for performing filtering or rate limiting on the inappropriate traffic and transmits the configuration information to the packet transferring device 1101, and accordingly configures the flow control section 1106 of the packet transferring device 1101.

An example of a detailed operation of the network control system of FIG. 11 will now be described using the flowchart shown in FIG. 12. The detailed description will commence with the processing at the packet transferring device 1101 when a packet 1201 arrives at the packet transmit/receive section 1105 from any of the networks 103, 104 or 105.

Packet reception commences when the packet 1201 arrives at the packet transmit/receive section 1105 (step 1202). More specifically, the packet transmit/receive section 1105 writes the content of the received packet 1201 into the packet buffer 1108, and notifies the CPU 1103 of the arrival of packet 1201 using an interrupt signal or the like. At this point, it is assumed that no rules for performing prohibition or rate limiting on the packet 1201 have been configured at the flow control information memory 1109.

Next, the CPU 1103 generates traffic information from the content of the packet stored in the packet buffer 1108 (step 1203). The method for generating traffic information is the same as step 503 of the flowchart shown in FIG. 5, and the content of the traffic information is the same as that of the traffic information 505 shown in FIG. 6. Alternatively, the traffic information 1205 may simply be a mirroring of the packet.

The CPU 1103 then transmits the traffic information to the network controller 1102 through the packet transmit/receive section 1105 as traffic information 1205 (step 1204). At this point, it is assumed that no rules for performing prohibition or rate limiting on the traffic information 1205 have been configured at the flow control information memory 1109.

Figure 5:
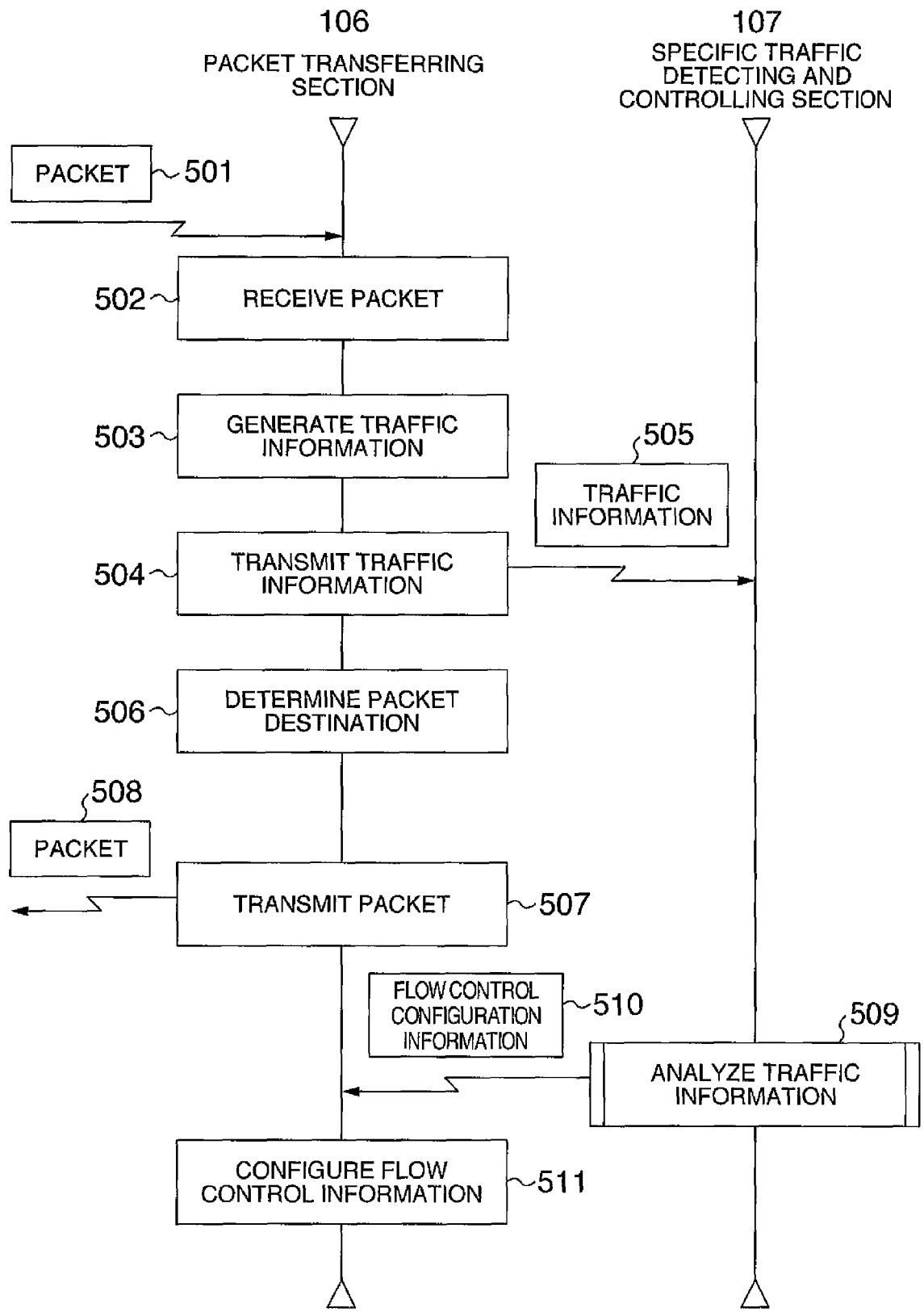
FIG. 5 is a flowchart showing an example of an operation of the network controller according to the first example.

Step 1204 is the same as step 504 in the flowchart shown in FIG. 5 in that an appropriate number of packets-worth of traffic information is collectively transmitted to the network controller 1102.

The CPU 1103 then determines a destination network of the packet stored in the packet buffer 1108 by referencing the routing table 1107 (step 1206). The content of the routing table 1107 is the same as in the routing table 113 of the first example shown in FIG. 1.

Finally, the packet stored in the packet buffer 1108 is sent as a packet 1208 to the destination network determined in step 1206 (step 1207).

Meanwhile, when the traffic information 1205 is received through the processing of step 1204, the network controller 1102 stores the content of traffic information 1205 received by the packet transmit/receive section 1112 into the traffic information buffer 1113, and notifies the CPU 1110 of the reception of the traffic information 1205 using an interrupt signal and the like (step 1209).

When the traffic information 1205 is transmitted to the CPU 1110, the CPU 1110 performs an analysis of the traffic information 1205, and when inappropriate traffic is detected, generates flow control configuration information 1211 to perform prohibition or rate limiting on the traffic, and transmits the information to the packet transferring device 1101 through the packet transmit/receive section 1112 (step 1210).

Upon receiving the flow control configuration information 1211, the CPU 1103 of the packet transferring device 1101 writes the content of the flow control configuration information 1211 into the flow control setting memory 1109 (step 1212). The flow control section 1106 is now able to perform control specified in the flow control configuration information 1211 such as prohibition or rate limiting on the packet specified in the flow control configuration information 1211.

The contents of the traffic information analysis performed by the network controller 1102 (step 1210) is the same as the traffic information analysis performed by the specific traffic detection and control section 107 of the first example (step 509 in FIG. 5). Therefore, details will not be provided here. The contents of the packet count table 1113, the threshold table 1115 and the control policy table 1116 are respectively the same as those of the packet count table 119, the threshold table 120 and the control policy table 121 shown in FIG. 1.

This concludes the description of the overall flow of the network control system according to the present example.

According to the present example, it is an advantage of the present invention that traffic considered to be problematic may be extracted at high speed, and a network control system capable of automatically performing measures such as prohibition or rate limiting on such traffic may be achieved by merely adding a device for collecting and analyzing information related to transferred traffic to an existing packet transferring device capable of transmitting information related to the traffic to the outside via a network.

3. Third Example

A third example will now be described. FIG. 13 is a diagram illustrating an alternate embodiment of the packet count table 119 of the first example shown in FIG. 1. The alternate embodiment is a table similar to the packet count table 119 that generates arbitrary itemsets for items composing traffic information to accumulate the number of packets containing the itemsets.

In the present example, it is assumed that four types of items compose the traffic information: namely, source IP address (src ip), destination IP address (dst ip), source port number (src port) and destination port number (dst port). An itemset of any n items (where $1 \leq n \leq 4$) is generated from these four items.

In the present invention, while the items to be processed have been limited to the above four types, items may be added or deleted according to the characteristics of the traffic to be detected. For instance, flag information contained in a TCP header may be included to extract traffic related to establishing and terminating TCP sessions. Alternatively, the first given number of bytes of the application data following a TCP header or a UDP header may be included to better understand the characteristics of the traffic. Alternatively, when an MPLS label is attached, the MPLS label can also be included to perform traffic analysis per LSP. Alternatively, when using a tunneling protocol such as L2TP, tunnel identifiers may be included to perform analysis on traffic passing through the tunnels on a per-tunnel basis.

In the packet count table 1300, all entries have fields of items composing the traffic information regardless of the number of items in the itemset. Fields of items composing the itemsets store the value of the item, while fields of other items store the number of types of values appearing in the count of the number of packets having the itemset. Therefore, fields corresponding to each item have attribute fields indicating whether the values stored in the field are values of the item or the number of appeared types.

For instance, entry number 4 of FIG. 13 represents that 20 packets with a source IP address Z, a destination IP address Y and a destination port number d has appeared, and that there were 8 types of source port numbers contained in the 20 packets.

Figure 14:
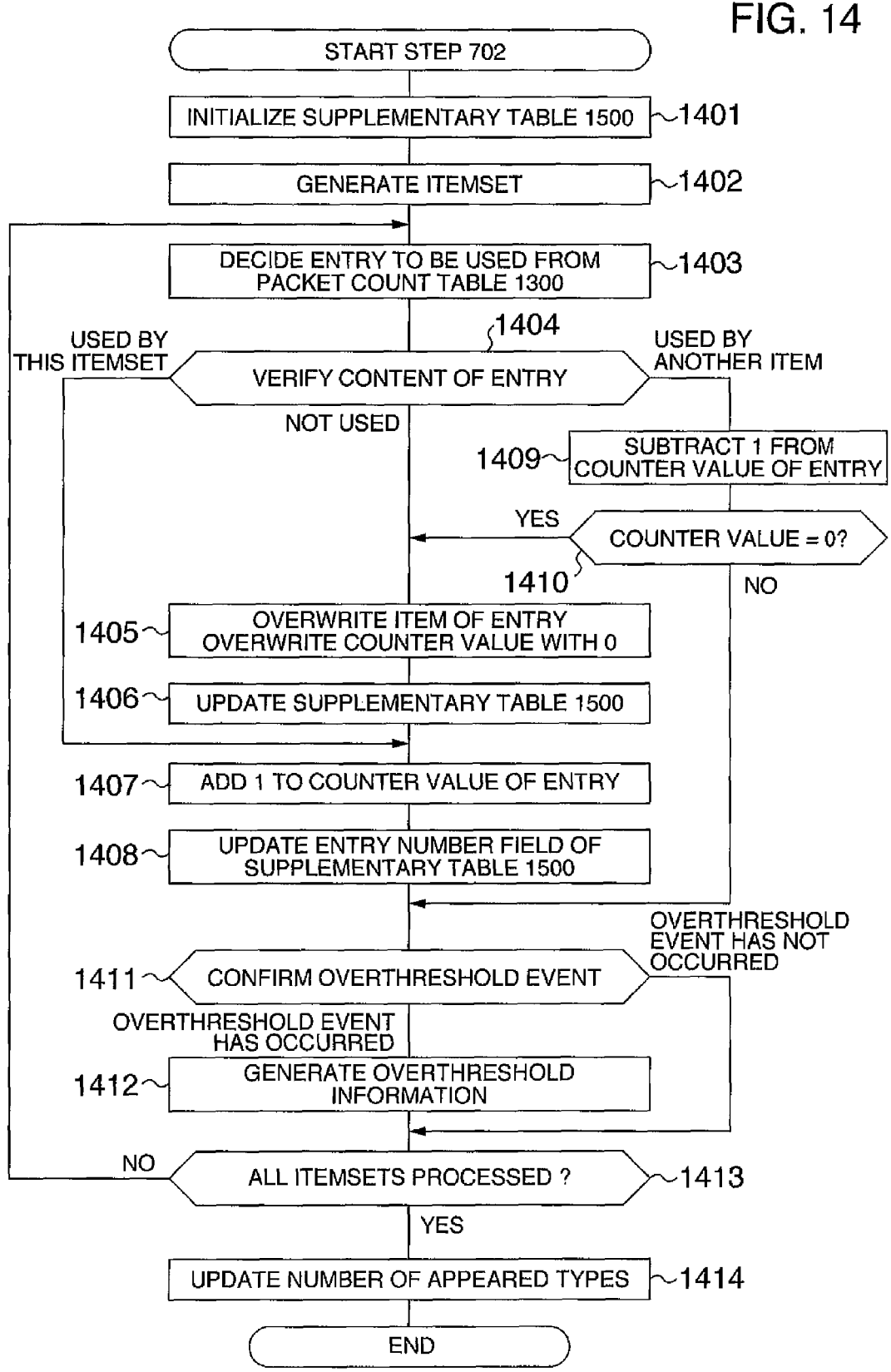
FIG. 14 is a flowchart showing an example of the details of updating the packet count table according to the third example.

When using the packet count table 1300, the flowchart of updating the packet count table (step 702) of FIG. 7 will be as shown in FIG. 14. The processing of step 702 when using the packet count table 1300 will now be described with reference to FIG. 14.

The CPU 116 first performs initialization of a supplementary table 1500 in step 1401.

The supplementary table 1500 is a table structured as shown in FIG. 15, and is composed of entries corresponding to each itemset. An entry is composed of a new appearance flag that indicates whether there are values newly appeared for items not contained in the itemsets, and a field for storing entry numbers of the packet count table 1300 that counts the number of packets for the itemsets.

The initialization of the supplementary table 1500 involves setting all values for the new appearance flags for all entries to 0, and entering values indicating no entry numbers in the entry number fields.

Next, the CPU 116 generates itemsets of n given items selected from the aforementioned four items (step 1402). In step 1402, while all itemsets that are mathematically obtainable may be generated, it is also possible to generate only a limited number of itemsets for the purpose of speeding up processing by reducing load.

Next, one itemset is selected from those generated in step 1402, and an entry in the packet count table 1300 for accumulating the number of packets containing the selected itemset is decided (step 1403). Examples of the selection algorithm include a method where an appropriate hash function is applied to the selected itemset, and the remainder of dividing the resulting hash value by the number of entries is used as an entry number.

Once the entry to be used in step 1403 is determined, the current content of the entry is verified (step 1404).

If the entry is unused, for items contained in the itemset among each item of the entry, the values of such items are written into their attribute fields as "values". On the other hand, for items not contained in the itemset, 0 is written into their attribute fields as "numbers of appeared types". Then, the packet number field is set to 0 (step 1405).

Next, the supplementary table 1500 is updated (step 1406). More specifically, after removing an arbitrary item from the itemset, among the new appearance flags of the entries of the supplementary table 1500 corresponding to the resulting itemset, the value of the field corresponding to the removed item is set to 1. This processing is performed for all itemsets obtained by removing an arbitrary item from the original itemsets. The processing of step 1406 functions to memorize, for an itemset, the appearance of a new item not contained in the itemset.

1 is then added to the packet number field of the entry selected in step 1403 (step 1407), and the entry numbers of the entries of the packet count table 1300 selected in step 1403 are stored in the entry number field of the entry corresponding to the itemset in the supplementary table 1500 (step 1408).

On the other hand, after step 1404, if the entry is already used by the selected itemset, the process jumps to step 1407 to add 1 to the number of packets in the entry. An entry already used by a selected itemset means that the itemset has appeared previously. Therefore, there is no need to update the new appearance flag of the supplementary table 1500, and the processing of step 1406 is also not required.

Meanwhile, after step 1404, if the entry is already used by another itemset, 1 is subtracted from the number of packets in the entry (step 1409). If the result is 0, the process skips to step 1405, otherwise the process skips to step 1411 (step 1410). This processing makes it easier for the itemset appearing more frequently to remain in the packet count table 1300 when different itemsets attempt to use the same entry in the packet count table 1300.

Next, the CPU 116 verifies whether the value of the number of packets field in the entry exceeds a predetermined threshold (step 1411). The predetermined threshold is stored in the threshold table 120.

In step 1411, when the value of the number of packets field equals any of the values defined in the threshold field of the threshold table 120, the CPU 116 determines that an overthreshold event has occurred, and generates overthreshold information (step 1412). The content of the overthreshold information of the present example is the overthreshold information shown in FIG. 8 with the table type 801 removed therefrom. The generated overthreshold information is temporarily stored in the memory 117.

The processing performed in steps 1403 through 1412 is repeated until all the itemsets generated in step 1402 are processed (step 1413).

Finally, referencing the supplementary table 1500, the values of the items with "numbers of appeared types" as the values of their attribute field in the entries of the packet count table 1300 are updated (step 1414). More specifically, for each entry of the packet count table 1300 that are indicated by the entry number field of each entry of the supplementary table 1500, 1 is added to the values corresponding to entries of the supplementary table 1500 with their new appearance flags set to 1. This is performed for all entries of the supplementary table 1500.

This concludes the detailed description of the operation performed in step 702 when using the packet count table 1300.

Figure 16:
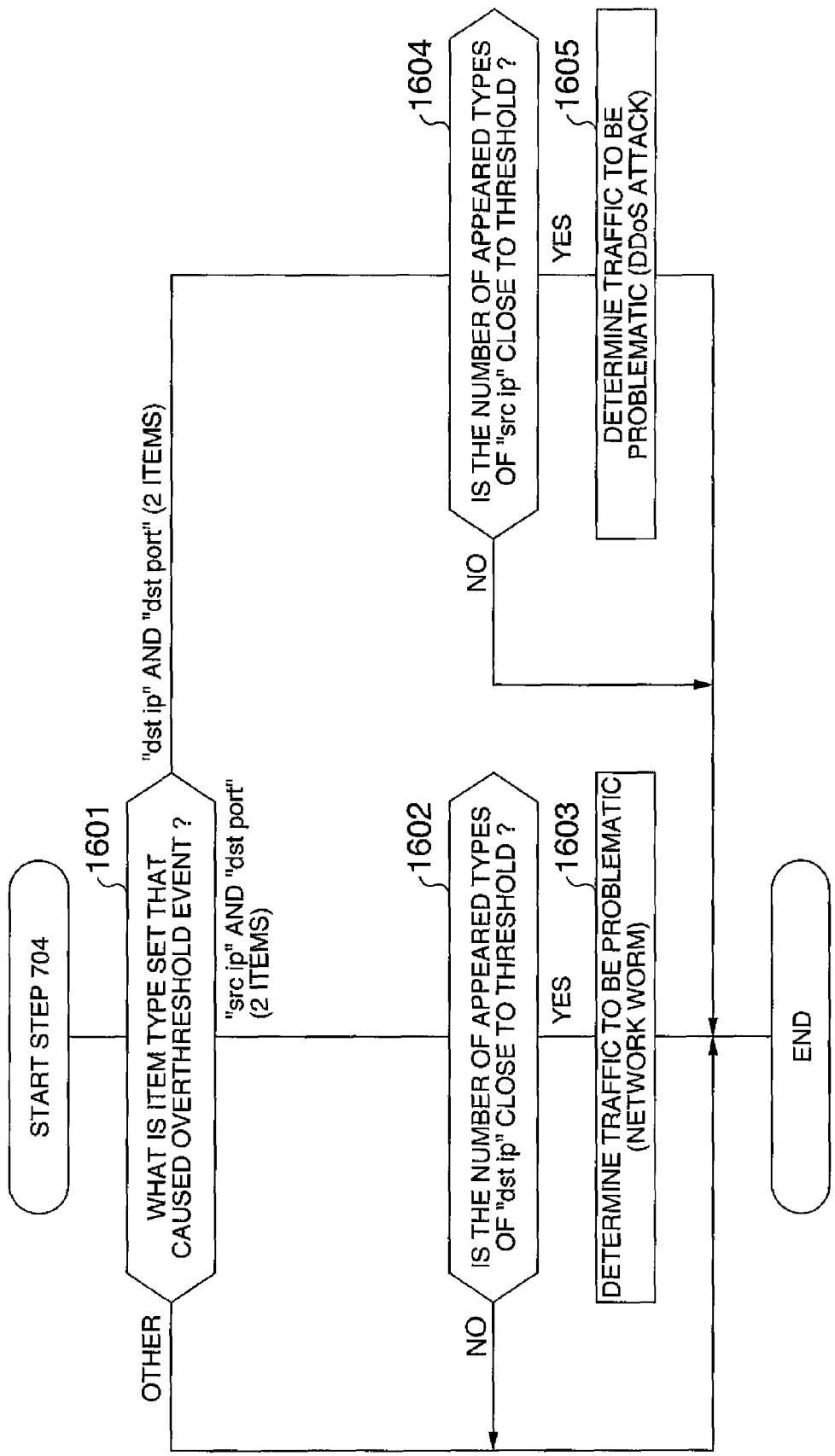
FIG. 16 is a flowchart showing an example of the details of determining problematic traffic according to the third example.

Furthermore, when using the packet count table 1300 according to the present example, the flowchart of the problematic traffic determination processing (step 704) shown in FIG. 7 will be replaced by the flowchart shown in FIG. 16. The processing of step 704 when using the packet count table 1300 will now be described below using FIG. 16.

First, among the items contained in the entries of the packet count table 1300 specified by the entry number 802 contained in the overthreshold information, the CPU 116 verifies itemsets of items with "values" as their attribute fields (step 1601).

Among the items contained in the entries, when the itemset with a value as its attribute field is a source IP address and a destination port number, it is determined that the traffic indicated by the overthreshold information is possibly traffic caused by a network worm outbreak, and steps 1602 and onward are performed for verification.

Computers infected by a network worm are likely to transmit traffic for further spreading the worm to an unspecified number of computers, and such traffic are usually forwarded to a particular port number. Therefore, when a large quantity of packets sharing a certain combination of a source IP address and a destination port number is observed, such packets may be determined to possibly be traffic caused by a network worm outbreak.

However, for instance, many packets sharing a certain combination of a source IP address and a destination port number are also observed during normal one-to-one communications between two particular computers. Therefore, in order to distinguish such normal traffic from traffic caused by network worm outbreaks, the number of appeared types of source IP addresses indicated in the entry is verified (step 1602).

In step 1602, when the number of appeared types is equal or close to the threshold, this means that the traffic is a transmission of packets with identical destination port numbers to an unspecified number of computers, and is thus determined that the traffic is highly likely to be caused by a network worm outbreak (step 1603).

Also, in step 1601, among the items contained in the entries, when the itemset with a "value" as its attribute field is a destination IP address and a destination port number, it is determined that the traffic indicated by the overthreshold information is possibly traffic caused by a DDoS attack, and steps 1604 and onward are performed for verification.

Computers under DDoS attack receive communication requests at the same port number from a multitude of computers. Therefore, when a large quantity of packets sharing a certain combination of a destination IP address and a destination port number is observed, such packets may be determined to possibly be traffic caused by a DDoS attack.

However, for instance, many packets sharing a certain combination of a destination IP address and a destination port number are also observed during normal one-to-one communications between two particular computers. Therefore, in order to distinguish such normal traffic from traffic caused by DDoS attacks, the number of appeared types of source IP addresses indicated in the entry is verified (step 1604).

In step 1604, when the number of appeared types is equal or close to the threshold, this means that the traffic is a transmission of packets with identical destination IP addresses and destination port numbers to an unspecified number of computers, and is thus determined that it is very likely that the traffic is caused by a DDoS attack (step 1605).

This concludes the detailed description of the operation performed in step 704 when using the packet count table 1300 according to the present example.

According to the present example, since the number of types of appeared items not included in the itemsets may be counted while counting the number of packets for each itemset, determination of problematic traffic can be performed at higher speeds due to less CPU load. In addition, by increasing the speed of basic processing for the determination of problematic traffic, high-precision determination of problematic traffic through the concomitant use of packet number count information of other itemsets can be achieved at practical CPU loads and processing speeds.

For instance, when it is determined in step 704 that traffic is likely to be caused by a DDoS attack, the concomitant use of packet number count information of other itemsets enables verification of whether the traffic is really an attack or otherwise a mass of normal access from a large number of computers is occurred. In this case, other itemsets represent opposing traffic transmitted from the computer under attack. More specifically, the itemsets are a combination of the two items of a destination IP address of traffic determined to be an attack as the source IP address, and the destination port number of traffic determined to be an attack as the source port number, and are those with a large number of appeared types of destination IP addresses. After searching the count information for these other itemsets in the packet count table 1300, if the number of packets is equal to or exceeds the number of packets used to determine a DDoS attack, this means that a considerable number of acknowledgment packets have been returned, and therefore it can be judged that the traffic is a concentration of normal access and not a DDoS attack.

While the above description presented a case where the packet count table 119 in the configuration illustrated in the first example (the configuration of FIG. 1) is replaced with the packet count table 1300 according to the present example, the same effect can be achieved by replacing the packet count table 1114 in the configuration illustrated in the second example (FIG. 11) with the packet count table 1300 according to the present example.

In addition to the examples described above, a first alternative embodiment of the present invention is a network controller wherein the unit for accumulating the number of packets with identical values in any one or more fieldsets of the packets obtains a region for storing the accumulated values of the number of packets from a hash value of a valueset of fields, and when the obtained region is already used to store accumulated values of other itemsets, the accumulated value of such other itemsets is subtracted, and is used for accumulating the number of packets of itemsets only when the subtraction results in an accumulated value of 0.

A second embodiment of the present invention is a network controller that monitors only packets sampled at a rate specified by an administrator of the controller.

A third embodiment of the present invention is a network controller that samples all packets having a certain characteristic specified by an administrator of the controller.

A fourth embodiment of the present invention is a network controller connected to a plurality of networks, comprising a unit for transferring packets between the networks, and a flow control unit for controlling availability of packet transfer or network band to be used, wherein the network controller changes the configuration of the flow control unit according to the characteristics obtained by a packet determination unit.

A fifth embodiment of the present invention is a network controller comprising a flow control unit for issuing instructions on methods of controlling packets under determination by a packet determination unit according to the characteristics obtained by the packet determination unit.

A sixth embodiment of the present invention is a network control system connected to a plurality of networks, composed of a packet transmitting device comprising a unit for transferring packets between the networks, a unit for transmitting monitoring information of packets, a flow control unit for controlling availability of packet transfer or network band to be used, and a unit for receiving configuration information for the flow control unit, and the aforementioned network controller, wherein the network controller receives monitoring information from the packet transmitting device, and transmits flow control information to the packet transmitting device.

A seventh embodiment of the present invention is a network control method that monitors packets flowing through connected networks and accumulates the number of packets with identical values in any one or more fieldsets of the packets obtained through monitoring, and when the accumulated number of packets exceed a specified threshold, estimates the characteristics of the number of packets exceeding the specified threshold from the values of any one or more fieldsets that is different from the abovementioned any one or more fieldsets.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network controller for controlling a network that transmits and receives packets, comprising:
   a first count section for counting the number of received packets having the same values for a first item group, the first item group consisting of a selected one or more items within a plurality of items contained in a flow information of the received packets,
   a second count section for counting the number of received packets having the same values for a predetermined one or more items in addition to the first item group of the flow information of the received packets, and
   a specific traffic detecting section that determines whether the count by the first count section exceeds a threshold and, if the count by the first count section exceeds the threshold, referring to the count by the second count section to determine abnormality types based on the count by the second count section,
   wherein both of the count by the first count section and the count by the second count section are always incremented every time the network controller receives a packet having the same values for the first item group and for the predetermined one or more items in addition to the first item group of the flow information.

2. The network controller according to claim 1, further comprising:
   a packet receiving section that receives packets from the network, and
   a flow information acquiring section that acquires the flow information from the received packets at the packet receiving section.

3. The network controller according to claim 1, wherein:
   the flow information includes at least one item of a source IP address, a destination IP address, a source port number and a destination port number.

4. The network controller according to claim 1, wherein:
   the specific traffic detecting section determines whether the count of the received packets having the same values for a second item group which includes items of a source address, a destination port number and a destination address, counted by the second count section, exceeds a predetermined value if the count of first packets having the same values for the first item group which includes items of a source address and a destination port number, counted by the first count section, exceeds the threshold.

5. The network controller according to claim 4, wherein:
   the specific traffic detecting section determines that an abnormality type of the received packets is a network worm when determining that the count of the received packets having the same values for the second item group exceeds the predetermined value.

6. The network controller according to claim 1, wherein:
   the specific traffic detecting section determines whether the count of the received packets having the same values for a second item group which includes items of a destination address, a destination port number and a source address, counted by the second count section, exceeds a predetermined value, if the count of first packets having the same values for the first item group which includes items of a destination address and a destination port number, counted by the first count section, exceeds the threshold.

7. The network controller according to claim 6, wherein:
   the specific traffic detecting section determines that an abnormality type of the received packets is a DDoS attack when determining that the count of the received packets having the same values for the second item group exceeds the predetermined value.

8. The network controller according to claim 1, wherein:
   the specific traffic detecting section determines whether the count of the received packets having the same source address, destination port number and destination address, counted by the second count section, satisfies a predetermined condition if the count of the received packets having the same values for the first item group which includes items of a source address and a destination port number, counted by the first count section, exceeds the threshold.

9. The network controller according to claim 8, wherein:
   the specific traffic detecting section determines that an abnormality type of the received packets is a network worm when determining that the count of the received packets, counted by the second count section, satisfies the predetermined condition.

10. The network controller according to claim 1, wherein:
    the specific traffic detecting section determines whether the count of the received packets having the same destination address, destination port number and source address, counted by the second count section, satisfies a predetermined condition if the count of the received packets having the same values for the first item group which includes items of a destination address and a destination port number, counted by the first count section, exceeds the threshold.

11. The network controller according to claim 10, wherein:
    the specific traffic detecting section determines that an abnormality type of the received packets is a DDoS attack when determining that the count of the received packets, counted by the second count section, satisfies the predetermined condition.

* * * * *